(12) United States Patent
Ravish Suvarna et al.

(10) Patent No.: US 12,510,618 B2
(45) Date of Patent: Dec. 30, 2025

(54) METHOD AND APPARATUS FOR DETERMINATION OF DIRECTION OF ARRIVAL ANGLE

(71) Applicant: NXP B.V., Eindhoven (NL)

(72) Inventors: Anusha Ravish Suvarna, Eindhoven (NL); Marco Jan Gerrit Bekooij, Empel (NL); Francesco Laghezza, Eindhoven (NL)

(73) Assignee: NXP B.V., Eindhoven (NL)

( * ) Notice: Subject to any disclaimer, the term of this patent is extended or adjusted under 35 U.S.C. 154(b) by 350 days.

(21) Appl. No.: 18/473,342

(22) Filed: Sep. 25, 2023

(65) Prior Publication Data

US 2024/0111012 A1      Apr. 4, 2024

(30) Foreign Application Priority Data

Sep. 26, 2022   (EP) ..................................... 22197829

(51) Int. Cl.
   *G01S 3/12*   (2006.01)
   *G01S 3/04*   (2006.01)
   *G01S 7/35*   (2006.01)

(52) U.S. Cl.
   CPC ............... *G01S 3/12* (2013.01); *G01S 3/043* (2013.01); *G01S 7/356* (2021.05)

(58) Field of Classification Search
   CPC . G01S 3/12; G01S 3/043; G01S 7/356; G01S 3/06; G01S 3/48; G01S 13/931; G01S 13/34; G01S 13/4454; G01S 7/358
   See application file for complete search history.

(56) References Cited

U.S. PATENT DOCUMENTS

2020/0225337 A1*   7/2020   Kishigami ................ G01S 7/41
2020/0326408 A1*  10/2020   Bialer ...................... G01S 7/41
(Continued)

FOREIGN PATENT DOCUMENTS

DE   102012105582 A1      1/2013
KR      20190124487 A  *  11/2019  ............. G01S 3/043
WO      2021197875 A1     10/2021

OTHER PUBLICATIONS

Machine translation of KR-20190124487-A (2019).*
(Continued)

*Primary Examiner* — Vladimir Magloire
*Assistant Examiner* — Anna K. Gosling (57) ABSTRACT

An apparatus configured to:
   receive an input dataset indicative of the amplitude and phase of radar signals received at a plurality of antenna elements;
   determine an objective function;
   determine a beam forming spectrum, the beam forming spectrum comprising a correlation of the input dataset with a set of beamsteering vectors;
   perform a first determination process for evaluation of the objective function comprising the processor being configured to:
      identify two or more peaks in the beam forming spectrum based on a predetermined threshold level, determine candidate direction-of-arrival angles therefrom for definition of a first-reduced search space;
   perform a second determination process for evaluation of the objective function comprising the processor being configured to:
      determine a peak direction-of-arrival angle comprising the direction-of-arrival angle that corresponds to a peak in the beam forming spectrum:
(Continued)

evaluate the objective function over the first reduced search space and using the peak direction-of-arrival angle.

20 Claims, 3 Drawing Sheets

(56) References Cited

U.S. PATENT DOCUMENTS

| | | |
|---|---|---|
| 2021/0116531 A1 | 4/2021 | Shabtay et al. |
| 2022/0283283 A1 | 9/2022 | Koppelaar et al. |
| 2023/0152435 A1 | 5/2023 | Koppelaar et al. |

OTHER PUBLICATIONS

Filho, G.L., "2-D Doa Estimation in a Cuboid Array Based on Metaheuristic Algorithms and Maximum Likelihood", International Journal of Communications, Network and System Sciences, pp. 121-137, doi: 10.4236/ijcns.2020.138008, Aug. 2020.

Heidenreich, P., "Antenna Array Processing: Autocalibration and Fast High-Resolution Methods for Automotive Radar", Ph.D. Thesis, TU Darmstadt, Jun. 2012.

Westhues, C., "Low-Complexity Super Resolution Angle Separation for Sparse Antenna Arrays Based on Frequency Domain Maximum Likelihood". IEEE Radar Conference, Mar. 21-25, 2022.

\* cited by examiner

METHOD AND APPARATUS FOR DETERMINATION OF DIRECTION OF ARRIVAL ANGLE

CROSS-REFERENCE TO RELATED APPLICATIONS

This application claims the priority under 35 U.S.C. § 119 of European Patent application no. 22197829.9, filed on 26 Sep. 2022, the contents of which are incorporated by reference herein.

FIELD

The present disclosure relates to an apparatus and method for determining the direction of arrival angles for each of a plurality of targets in a dataset indicative of radar signals received at an antenna array. In particular, it relates to the use of Deterministic Maximum Likelihood techniques. The disclosure also relates to a radar system configured to perform said method, such as a frequency-modulated-continuous-wave, FMCW, radar system.

BACKGROUND

Deterministic Maximum-Likelihood (DML) Direction-of-Arrival (DoA) estimation is a technique for determination of the directions of arrival angles of component radar signals reflected from each of a plurality of targets in radar signals received at a plurality of antenna elements. The antenna elements may be part of a FMCW radar.

SUMMARY

According to a first aspect of the present disclosure there is provided an apparatus comprising a processor configured to:
  receive an input dataset indicative of the amplitude and phase of radar signals received at a plurality of antenna elements, wherein the radar signals have reflected from a plurality of targets;
  determine an objective function, based on the input dataset, for evaluation over a plurality of points of a search space, the points of the search space representing possible direction-of-arrival angles of said radar signals from the plurality of targets and wherein the objective function is indicative of the correspondence between the possible direction-of-arrival angles of said plurality of targets and the input dataset;
  determine a beam forming spectrum, the beam forming spectrum comprising a correlation of the input dataset with a set of beamsteering vectors, wherein the set of beamsteering vectors include one beamsteering vector for each point of the search space wherein a beamsteering vector comprises a function of direction-of-arrival angle that represents the expected response at the plurality of antenna elements of a target with unit amplitude;
  perform a first determination process for evaluation of the objective function comprising the processor being configured to:
    identify two or more peaks in the beam forming spectrum based on a predetermined threshold level, wherein the two or more peaks comprise peaks that exceed the predetermined threshold level,
    determine two or more candidate direction-of-arrival angles that correspond to the identified two or more peaks;
    define a first-reduced search space based on the two or more candidate direction-of-arrival angles;
  perform a second determination process for evaluation of the objective function comprising the processor being configured to:
    determine a peak direction-of-arrival angle comprising the direction-of-arrival angle that corresponds to a peak in the beam forming spectrum that has the greatest magnitude; and wherein the processor is configured to:
  evaluate the objective function to determine a final set of estimated direction-of-arrival angles for the plurality of targets comprising the direction-of-arrival angles which one of maximize or minimize the objective function wherein the objective function is evaluated over the first reduced search space and wherein said evaluation of the objective function is performed with the direction-of-arrival angle of one of the plurality of targets set to the peak direction-of-arrival angle and the direction-of-arrival angle of the other of the plurality of targets is iteratively set to the direction-of-arrival angles that correspond to the points of the search space.

In one or more embodiments, if the number of peaks identified in the beam forming spectrum is three or more, the evaluation of the objective function over the first-reduced search space is at least based on a first proposal in which the plurality of targets comprise two targets and wherein the objective function is evaluated for different combinations of two of the candidate direction-of-arrival angles.

In one or more embodiments, if the number of peaks identified in the beam forming spectrum is three or more, the evaluation of the objective function over the first-reduced search space is at least based on a second proposal in which the plurality of targets comprise three targets and wherein the objective function is evaluated for different combinations of three of the candidate direction-of-arrival angles.

In one or more embodiments, if the number of peaks identified in the beam forming spectrum is two, the first set of estimated direction-of-arrival angles comprise the candidate direction-of-arrival angles.

In one or more embodiments, the first determination process of the objective function comprises a first step and a second step, wherein the first step comprises the determination of the two or more candidate direction-of-arrival angles that correspond to the identified two or more peaks; and the definition of the first-reduced search space based on the two or more candidate direction-of-arrival angles; and wherein the second step comprises the processor being configured to:
  select a combination of candidate direction-of-arrival angles of the two or more candidate direction-of-arrival angles which resulted in one of the highest or lowest evaluation of the objective function;
  define a second-reduced search space comprising the selected combination of candidate direction-of-arrival angles and including a predetermined number of points in the search space either side of each of the selected combination of candidate direction-of-arrival angles; and
  wherein the evaluation of the objective function additionally includes the evaluation over the second-reduced search space.

In one or more embodiments, the correlation to determine the beam forming spectrum is calculated by Fourier transform of the input dataset, wherein the input dataset is formed of complex representations of the amplitude and phase of the radar signals.

In one or more examples, the determination of the beam forming spectrum comprises padding the vector derived from the received input dataset to a predetermined size and wherein the correlation is determined by Fourier transform.

In one or more examples, the predetermined size is reached by adding zero-valued entries to the input dataset, the zero-valued entries added at least at positions in the input dataset relative to the data that is indicative of the radar signals received at the plurality of antenna elements such that the data indicative of the radar signals have positions in the input dataset that correspond to a physical arrangement of the antenna elements and the zero-valued entries have positions in the input dataset that correspond to one or more gaps between the physical arrangement of the antenna elements and, thereby, the number of zero-valued entries between any two consecutive instances of the data indicative of the radar signals represents an inter-antenna element spacing.

In one or more embodiments, the predetermined threshold level is based on the configuration of the plurality of antenna elements.

In one or more embodiments, the final set of direction-of-arrival angles comprises the direction-of-arrival angles that resulted in the one of the maximal and minimal evaluation of the objective function as determined based on the first determination process and the second determination process.

In one or more examples, the evaluation of the objective function comprises the repeated evaluation of the objective function for a plurality of candidate matrices based on matrix A that each include different direction-of-arrival-angle vectors over the respective search space, wherein said set of direction of arrival angles are derived from one of the candidate matrices of the plurality of candidate matrices that provides one of a maximum and a minimum evaluation of the objective function over the search space.

In one or more embodiments, the apparatus comprises a frequency-modulated-continuous-wave, FMCW, radar system.

In one or more embodiments, if only one peak is found in the beam forming spectrum the apparatus is configured to perform the second evaluation process.

In one or more embodiments, the input dataset comprises a dataset that has been Range-Doppler processed such that the input dataset is representative of radar signals that have reflected from targets at a predetermined range of distances from the antenna elements and a predetermined range of radial velocities relative to the antenna elements.

In one or more examples, the step of determining an objective function comprises determining an objective function for evaluation over a plurality of points of a search space that correspond to possible direction-of-arrival angles of said plurality of targets, wherein the objective function is based on the input dataset and a plurality of direction-of-arrival-angle vectors comprising one for each one of the plurality of targets, each direction-of-arrival-angle vector representing an expected response at the plurality of antenna elements of the radar signals from the target with a predetermined amplitude and comprising a function of a direction-of-arrival angle relative to the plurality of antenna elements.

In one or more examples, such a determination of the objective function comprises determining an objective function based on a beam forming method, as will be familiar to those skilled in the art.

In one or more embodiments, one of:
the objective function is formulated such that the greater the value obtained upon its evaluation, the greater the probability that the possible direction-of-arrival angles used in its evaluation are those that resulted in the receipt of the input dataset and wherein said evaluation of the objective function is configured to maximize the objective function; and
the objective function is formulated such that the lesser the value obtained upon its evaluation, the greater the probability that the possible direction-of-arrival angles used in its evaluation are those that resulted in the receipt of the input dataset and wherein said evaluation of the objective function is configured to minimize the objective function.

In one or more embodiments, the plurality of antenna elements comprise one of:
a Multifunction Reconfigurable Antenna, MRA, Multiple-In-Multiple-Out, MIMO, antenna array;
a Uniform Linear Array antenna.

According to a second aspect of the present disclosure there is provided a method for determining direction-of-arrival angles for radar signals, the method comprising:
receiving an input dataset indicative of the amplitude and phase of radar signals received at a plurality of antenna elements, wherein the radar signals have reflected from a plurality of targets;
determining an objective function, based on the input dataset, for evaluation over a plurality of points of a search space, the points of the search space representing possible direction-of-arrival angles of said radar signals from the plurality of targets and wherein the objective function is indicative of the correspondence between the possible direction-of-arrival angles of said plurality of targets and the input dataset;
determining a beam forming spectrum, the beam forming spectrum comprising a correlation of the input dataset with a set of beamsteering vectors, wherein the set of beamsteering vectors include one beamsteering vector for each point of the search space wherein a beamsteering vector comprises a function of direction-of-arrival angle that represents the expected response at the plurality of antenna elements of a target with unit amplitude;
performing a first determination process for evaluation of the objective function comprising:
identifying two or more peaks in the beam forming spectrum based on a predetermined threshold level, whether the two or more peaks comprise peaks that exceed the predetermined threshold level,
determining two or more candidate direction-of-arrival angles that correspond to the identified two or more peaks, and wherein the number of candidate direction-of-arrival angles correspond to the number of identified peaks;
defining a first-reduced search space based on the two or more candidate direction-of-arrival angles;
performing a second determination process for evaluation of the objective function comprising:
determining a peak direction-of-arrival angle comprising the direction-of-arrival angle that corresponds to a peak in the beam forming spectrum that has the greatest magnitude;

wherein the method comprises evaluating the objective function to determine a final set of estimated direction-of-arrival angles for the plurality of targets comprising the direction-of-arrival angles which one of maximize or minimize the objective function, wherein the objective function is evaluated over the first reduced search space and wherein said evaluating of the objective function is performed with the direction-of-arrival angle of one of the plurality of targets set to the peak direction-of-arrival angle and the direction-of-arrival angle of the other of the plurality of targets is iteratively set to the direction-of-arrival angles that correspond to the points of the search space.

According to a third aspect of the present disclosure there is provided a non-transitory computer readable medium comprising computer program code configured to perform the second aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
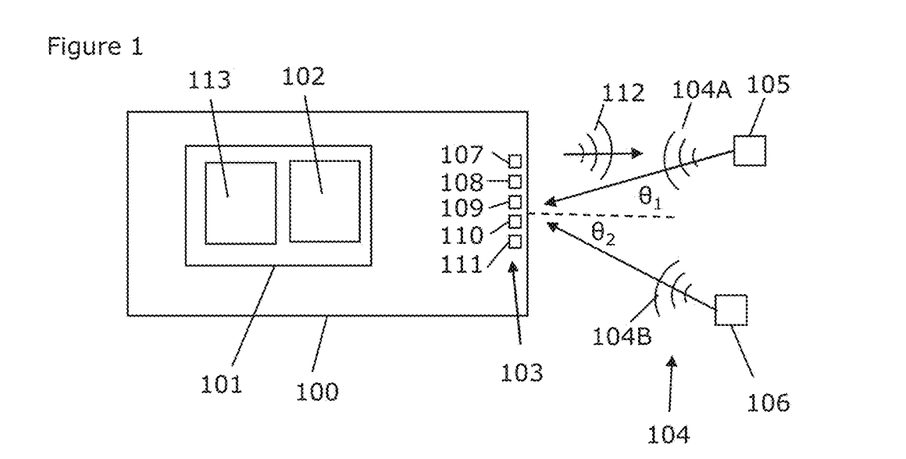
FIG. 1 shows an example embodiment of an apparatus and a FMCW system.

FIG. 1 shows an example embodiment of a FMCW system 100. The system comprises an apparatus 101, which may comprise a processor 102, for processing data indicative of radar signals 104 received by an antenna array 103. The radar signals 104 may comprise reflections from one or a plurality of targets 105, 106.

The antenna array 103 comprises a plurality of antenna elements 107-111. One or more of the antenna elements may be configured to transmit radar signals, which may comprise a FMCW chirp 112, that will reflect from the targets 105, 106. Two or more of the antenna elements 107-111 may be configured to receive the reflected radar signals 104A, 104B from the targets 105, 106.

FMCW radar has many applications and may be used in the automotive field to detect targets in the neighbourhood of the vehicle with the objective to make driving safer and more comfortable. Distance to the target(s) 105, 106 and the relative velocity of the target(s) can be estimated. The use of several antenna elements 107-111 to transmit and receive radar signals allows for the direction in which this target is present to be determined and it is typically represented as an angle relative to a direction of the antenna elements.

The reflected radar signal 104A from the first target 105 has a direction of arrival angle of $\theta_1$ at the antenna elements 107-111. The reflected radar signal 104B from the second target 106 has a direction of arrival angle $\theta_2$ at the antenna elements 107-111. However, the radar signals 104 as received by the antenna elements 107-111 comprises a combination of the signals 104A and 104B and noise. It will also be appreciated that the direction of arrival angle may represents the angle of arrival of the reflected radar signals 104A, 104B in one or both of an azimuth angle and an elevation angle.

Accordingly, it is necessary to processes the received radar signals to determine, optionally, the number of targets (if not known or otherwise determined) and the direction of arrival angles $\theta_k$ of K targets, which in this example comprise $\theta_1$ and $\theta_2$.

Deterministic Maximum-Likelihood (DML) Direction-of-Arrival (DoA) estimation is a known process for determining the most likely (including likely) angles from which the radar signals 104A, 104B are received to create the observed combination of radar signals 104 as received by the antenna elements 107-111.

The transmitted radar signals are reflected by the target(s) 105, 106 and received by the receive antenna elements of the radar system 100 and, depending on the direction of arrival angle of the reflected wave(s) $\theta_1$ and $\theta_2$, different path-lengths between a transmit antenna element(s), targets 105, 106 and receive antenna elements are realised, leading to phase differences in the received radar signals between the antenna elements. Analysis of these phase differences is carried out to estimate the direction of arrival angle of the target(s).

Direction of arrival angle estimation based on data from the antenna array 103 is an important matter for radar systems 100. If the radar signals received originate from one target 105, the signal strength at the antenna elements 107-111 is substantially identical but due to path length differences between antenna elements 107-111 and target 105 the phase of the radar signal will be different and is a function of the direction of arrival angle.

Figure 2:
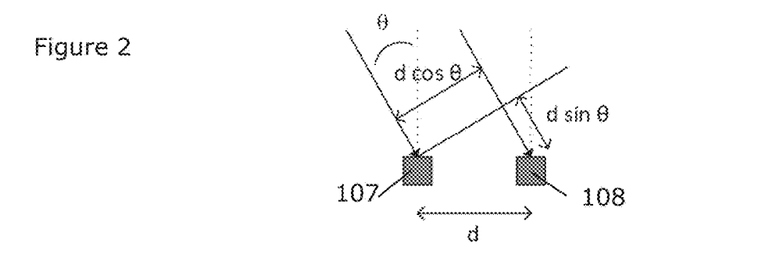
FIG. 2 shows an example embodiment of a pair of antenna elements illustrating a direction of arrival angle.

FIG. 2 shows two example antenna elements, which may comprise antenna elements 107 and 108 receiving the radar signal 104A. The path length difference is given by d sin θ where d is the antenna element spacing and θ is the direction-of-arrival angle.

When multiple targets 105, 106 are reflecting, a linear combination of these signals will be received. Because of the linear combination, both the amplitude and the phase per antenna element 107-111 will vary and has to be used to estimate the DoA angles of the targets 105, 106.

In practice the number of targets 105, 106 is unknown and has to be estimated as well. In one or more examples, data from the antenna array 103 can be pre-processed to analyse the space in which the targets are located.

Using radar signals, such as FMCW radar signals, one can use the known technique of Range-Doppler processing to quantize the received signal in Range and Doppler shift (i.e. frequency change). For each Range-Doppler combination for which one has detected energy (above a threshold), one can carry out the DoA estimation. The Range-Doppler pre-processing separates targets on the basis of their distance from the antenna array 103 and their velocity (Doppler) and therefore the number of targets per Range-Doppler bin are expected to be low. The properties of the radar signals, such as FMCW signals, determine how fine the radar scene is quantized in Range and Doppler.

With an appropriate designed radar system it is reasonable to assume that having one target present in the radar data of one Range-Doppler bin is more likely than having two present in the radar data of one Range-Doppler bin, and 2 targets more likely than 3 targets etc. In one or more examples, therefore, an algorithm to solve the DoA problem may therefore start with searching first for only one target, then for two targets, then for three targets, etc. When each of these searches indicates how well the found candidate DoA's match with the received radar data signals then one can stop searching for more targets if the match with the received signal is sufficiently close (e.g. above a threshold level of confidence). Noise in the radar system is a reason why an exact match is unlikely to happen. Since noise power is estimated in radar systems, a threshold may be derived to evaluate the match.

Deterministic Maximum Likelihood DoA estimation is a technique that for a given number of targets can determine what the most likely DoA angles are and what their match is to the received radar signal. In one or more examples, the DML algorithm may be configured to find the DoA angles that maximizes the match with the received radar data. In case a K-target search with DML finds a match that is too poor (e.g. below a threshold level of a match) on the basis of the known noise properties, then one proceeds with a (K+1)-target search with DML. A DML search for (K+1) targets is more complex than a search for K targets. Therefore, in a practical implementation one has to stop after a certain K because of limitations in computing resources to search for more targets. Moreover, system imperfections (amplitude and phase distortions, noise) also limits the number of targets one successfully can estimate. In one or more examples a practical value for K is therefore from 1 to 2 or 1 to 3 or 1 to 4 or 1 to 5 potential targets.

DoA estimation may be carried out for each Range-Doppler bin for which sufficient energy is detected. In a rich radar scene this means that DoA estimation may have to be carried out many times within a system cycle. For that reason it is important that the corresponding complexity of the DoA estimation process is low.

DoA estimation starts with the radar signals received at the antenna elements or, more particularly, an input dataset representing the reflected radar signals received at the antenna elements 107-111. The input dataset can be represented collectively with an N-dimensional vector $\underline{x}=(x_1, \ldots, x_N)^T$, which is often called a snapshot, and wherein T stands for transpose, such that x is a column vector. The number of antenna elements is N. During a system cycle, radar signals received by the apparatus 101 may comprise data representative of the received signals at each of the antenna elements 107-111. In one or more examples, during a system cycle, radar signals received by the apparatus may comprise input datasets or snapshots extracted from one or more Range-Doppler bins. In one or more examples, DoA estimation may be carried out only for those Range-Doppler bins that contain radar signals having an energy above a certain threshold. Thus, the following process can be performed on the data whether or not Range-Doppler processing has been performed.

A signal received from a target at DoA angle $\theta_1$ will result in a response at the antenna elements 107-111. That response has constant amplitude and a phase relation between the antenna elements that is specific for the DoA angle $\theta_1$ and the relative positions of the antenna elements 107-111. The response can be denoted with a vector: $\underline{a}_1=\underline{a}(\theta_1)$. When at least two antenna elements have a distance $\leq \lambda/2$, and the DoA angle $\theta$ may be between −90 and 90 degrees, any two single target responses will be different and therefore the DoA angle of a single target response can be unambiguously determined. For multiple, say K targets, the antenna response will be a linear combination of K single target responses, i.e.

$$\underline{x}=\Sigma_{k=1}^{K} s_k \underline{a}_k + \underline{n},$$

where $\underline{n}$ represents additive noise, and $s_k$ represent the complex amplitude of the targets and $\underline{x}$ represents an input dataset representing the radar signals received at the antenna elements 107-111, and $\underline{a}_k$ comprises a vector (known in that art as a beamsteering vector) and comprises a function of the DoA, wherein $$\underline{a}_n^T = (e^{j\, 2\pi(d_1/\lambda)\sin\theta_n}, e^{j\, 2\pi(d_2/\lambda)\sin\theta_n}, \ldots, e^{j\, 2\pi(d_N/\lambda)\sin\theta_n})$$

and $(d_1, \ldots, d_N)$ are the relative positions of the antenna elements or virtual antenna elements. The vector $\underline{a}_n$ carries the relative phase behaviour among the antenna elements due to pathlength difference of a planar wave originating from an angle $\theta_n$.

Figure 3:
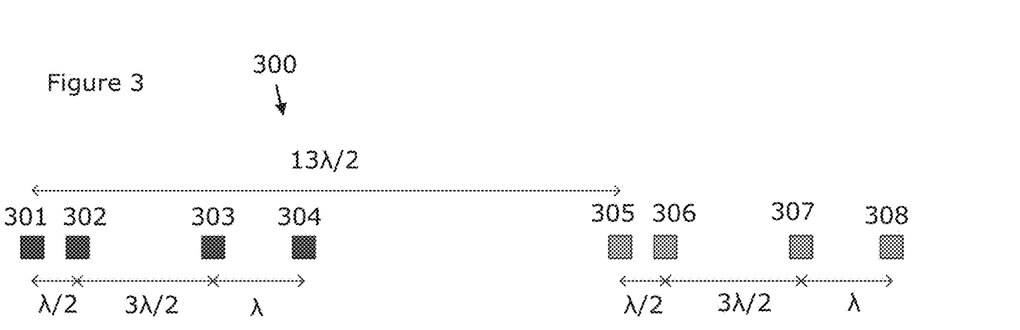
FIG. 3 shows an example embodiment of a plurality of antenna elements, wherein the antenna elements may be true antenna elements or virtual antenna elements or a combination.

FIG. 3 shows an example antenna array 300 with antenna elements 301-308 separated by distances d of different fractions of the operating wavelength. For example, the antenna array 300 may be configured to operate according to a MIMO scheme for which the positions of the two virtual antenna elements 301, 305 are indicative of the positions of the transmitters and are separated by 13 $\lambda/2$, and the virtual antenna elements 301, 302, 303, 303 are indicative of the receive array with antenna spacing (0, 1, 4, 6)$\lambda/2$, that in this specific example forms a Minimum Redundancy Array. Together they form a virtual antenna array with relative element positions $(d_1, \ldots, d_8)=(0, 1, 4, 6, 13, 14, 17, 19)\lambda/2$. Thus, in one or more examples, the antenna array 300 may comprise a combination of true and virtual antenna elements depending on the configuration of the antenna array. In other examples, the antenna array 300 may comprise all true antenna elements, i.e. the scenario in which the radar system will use one transmitter 301 antenna and eight receive antennas 301-308. Thus, the term antenna element can refer to true (real) antenna elements as well as virtual antenna elements.

The processing performed by the apparatus is based on the aforementioned input dataset. The input dataset may be from a Range-Doppler bin if the optional Range-Doppler processing is performed.

A general description of DML-DoA determination will be provided followed by embodiments of the example embodiment apparatus 101.

Thus, to summarise, an input dataset or snapshot is represented with a vector $\underline{x}$. The snapshot represents the reflected radar signals received at the N antenna elements 107-111. If Range-Doppler processing is applied, the snapshot may comprise the reflected radar signals received at the N antenna elements extracted from a Range-Doppler bin, as will be familiar to those skilled in the art. Furthermore, we assume that K targets are present in a snapshot (e.g. K targets are contained in one Range-Doppler bin) with different DoA angles $\theta_1, \theta_2, \ldots, \theta_K$. The K targets can be represented with a beamsteering matrix A consisting of K beamsteering vectors $(\underline{a}_1, \underline{a}_K)$. A beamsteering vector is the expected response of single target with unit amplitude and, as mentioned above, is given by $$\underline{a}_n^T = (e^{j\ 2\pi(d_1/\lambda)\sin\ \theta_n},\ e^{j\ 2\pi(d_2/\lambda)\sin\ \theta_n},\ \ldots,\ e^{j\ 2\pi(d_N/\lambda)\sin\ \theta_n}),$$

where $(d_1, \ldots, d_N)$ are the relative positions of the virtual antenna elements.

A signal amplitude vector $\underline{s}$ represents the complex amplitudes of the individual targets. Furthermore we assume that the snapshot is corrupted by antenna noise and that the noise is identical and independent distributed zero-mean Gaussian with variance $\sigma^2$. Hence, $\underline{x} = A\underline{s} + \underline{n}$. Because of the Gaussian noise assumption, one can write the joint probability density function of the snapshot as $$p(\underline{x}) = \frac{1}{\pi^N \sigma^{2N}} e^{-\frac{|\underline{x} - A\underline{s}|^2}{\sigma^2}}$$

with $(\underline{n} = \underline{x} - A\underline{s})$

The Maximum-Likelihood (ML) estimate of $\underline{s}$ and A can be found by minimizing (mathematically, the maximization can be solved by differentiating $\log(p(\underline{x}))$ with respect to $\underline{s}$ and by requiring equality to zero)

$$Q = |\underline{x} - A\ \underline{s}|^2$$

To solve this equation, that is find the K most likely DoAs to the targets and their complex amplitude, a bootstrapping approach is followed.

Assuming that A is known, that is to propose a candidate set of beamsteering vectors represented as A, one can find $\underline{s}$ by minimizing Q in the least square sense:

$$\hat{\underline{s}} = (A^H A)^{-1} A^H \underline{x}$$

This result is substituted back into the expression for Q. Hence, as will be familiar to those skilled in the art, after some mathematical formatting one obtains $$Q = \underline{x}^H (I - \pi_A) \underline{x}, \text{ where } \pi_A = A(A^H A)^{-1} A^H$$

This matrix $\pi_A$ is called the projection onto the column space of A. Since, the beamsteering matrix A is a function of the K beamsteering vectors that represent the candidate DoA angles $\underline{\theta} = \theta_1, \theta_2, \ldots, \theta_K$, the DML problem can now be formulated as the search for a K-dimensional vector $\underline{\theta}$ $$\underline{\theta}_{DML} = \arg\ \min_{\underline{\theta}} Q$$

An equivalent notation for Q is using the trace operator (Tr( )) is given by:

$$Q = \underline{x}^H (I - \pi_A) \underline{x} = \text{Tr}((I - \pi_A) \underline{x}^H \underline{x})$$

In these expressions the DML objective function equal to:

$$f(\pi_A, \underline{X}) = \underline{x}^H \pi_A \underline{x} = \underline{x}^H A(A^H A)^{-1} A^H \underline{x} = \underline{x}^H A$$
$$(A^H A)^{-1} A^H \underline{x} = \underline{y}^H (A^H A)^{-1} \underline{y} = \text{Tr}(\pi_A \underline{x}^H \underline{x})$$

As an example, in case we search for two DoA angles, we can compute $y = A^H x$ by performing two times a correlation of a column of A with the input dataset or "snapshot" $\underline{x}$.

As preparation for the DML algorithm one starts with the definition of an e.g. 1-Dimensional search space (although the principle can be extended to 2-Dimensional search spaces) that has a granularity (i.e. points in the search space) that reflects the resolution and/or the wanted accuracy.

One can select $N_\theta$ discrete points in the range $[-\pi/2, \pi/2]$. As will be understood, if the desired field-of-view is smaller one can select accordingly a smaller search space, such as with fewer discrete points.

With such a search space or "grid" and the search for K targets, the search space has size $$N_K = \binom{N_\theta}{K}.$$

E.g. with the search for K=2 targets and a grid of size $N_\theta = 256$ the number of discrete points to be investigated is equal to $N_K = \frac{1}{2} N_\theta (N_\theta - 1) \sim 2^{15} = 32$ k.

We now provide a coarse outline of the DML algorithm.

Coarse DML Algorithm Outline

For $n = 1 : N_K$,
    Select $A = (\underline{a}_1, \ldots, \underline{a}_K)$
    Calculate $\pi_A = A(A^H A)^{-1} A^H$ (projection operator signal space)
    Evaluate DML objective function $f(\pi_A, \underline{X})$ (or $f(\pi_A, \hat{R})$)
End As the algorithm progresses, as each candidate set of beamsteering vectors as represented by the beamsteering matrix is selected, one has to keep track of the maximum value (or minimum depending on how the objective function is formulated) of the DML objective function. Thus, each index n is uniquely associated with a set of candidate beamsteering vectors and therefore also with a set of K candidate DoA angles. The index n for which the DML objective function is maximal (or above a threshold) determines the Maximum-Likelihood estimate of the DoA of the K targets. Likewise, depending on how the objective function is formulated the index n for which the DML objective function is minimal (or below a threshold) may determine the Maximum-Likelihood estimate of the DoA of the K targets.

As described above the evaluation of the objective function may involve performing a correlation with the beamsteering vectors, as will be described in more detail below. In general, for a non-uniform linear array the correlation with all beamsteering vectors on the grid may be carried out using a zero-padded FFT of size $N_\theta$.

Figure 4:
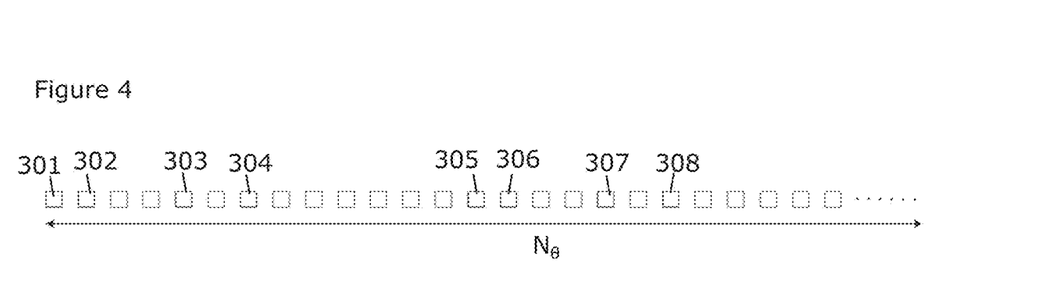
FIG. 4 shows an example embodiment of the same distribution of antenna elements as FIG. 3 but projected on a uniform grid with spacing between the antenna elements of $\lambda/2$.

FIG. 4 shows the same antenna elements (including virtual antenna elements) projected on a uniform grid with antenna element spacings of $\lambda/2$. This projection shows how data representative of the radar signals extracted from the (virtual) antenna elements can be inserted in a vector of values that can be analysed using Fourier transform processing, such as FFT. FIG. 4 also illustrates the generation of a zero-value inserted input dataset that has length $N_\theta$ wherein $N_\theta$ represents the number of discretized points of the search space. The zero-value inserted input dataset is thus derived from the input dataset indicative of the reflected radar signals received at the antenna elements 301-308 and includes said added zero-valued entries. The zero-valued insertion may be needed when we have a non-uniform linear antenna element array, i.e. the virtual antenna elements are at locations that are multiples of $\lambda/2$, but not at every multiple of $\lambda/2$ a virtual antenna is present as shown in FIG. 4. In example FIG. 4 we have antenna elements at positions $\{0,1,4,6,13,14,17,19\} \times \lambda/2$, Hence, there are no antenna elements present at positions {2, 3, 5, 7, 8, 9,10, 11, 12, 15, 16, 18}×λ/2. It is at these positions that the zero-valued entries are inserted.

In one or more examples zero-value insertion may be performed to pad the input dataset to the predetermined number of entries by adding zero-valued entries in the input dataset at positions after the data indicative of the radar signals. Thus, the padding may be performed because we want to evaluate the objective function at $N_\theta$ direction-of-arrival angles. Using FFT for performing a correlation, one can do this efficiently by extending the input dataset (e.g. vector) $\underline{x}$ using zero-valued entries at the locations $\{20, 21, \ldots, N_\theta-1\} \times \lambda/2$.

FFT can be used to obtain a correlation that forms part of the assessment of the objective function. It has the advantage that when a non-uniform grid of DoA angles is tested, there is a more dense grid for DoA's around $\theta=0$ and a less dense grid for DoA's around $\theta=\pm\pi/2$. In FIG. 4, it is shown how the snapshot of a 2×4 MRA MIMO array (Multifunctional Reconfigurable Antenna Multiple-input Multiple-output) has to be provided to a FFT. A 2×4 MRA MIMO radar array leads to a non-uniform virtual array with 8 elements. As mentioned above, this virtual array has virtual elements at relative positions $(d_1, \ldots, d_8)=(0, 1, 4, 6, 13, 14, 17, 19)\lambda/2$. The FFT can also be used to increase the density of the search grid by appending zeros after the last antenna element. A typical choice for the FFT length is $N_\theta=256$, such that the output of the FFT represents the correlation of the snapshot with $N_\theta=256$ beamsteering vectors.

Firstly, the complexity of the DML algorithm is determined by two factors: (1) the size of the search space $N_K$ and (2) the complexity needed to evaluate the DML objective function at one point in the K-dimensional space. The choice of $N_K$ is determined by the desired accuracy. In some known examples, the number of points in the search space over which the objective function is evaluated is limited by applying a stopping criterion. Thus, if one has sufficient confidence that the DML objective function is close to its maximum, one can stop the search based on conditions defined by the stopping criterion. In the examples that follow the apparatus 101 is configured to reduce the complexity is by application of a selective search rather than an exhaustive search.

Furthermore, one should take care of efficient implementation of inner-loop in which the correlation is perform and where the objective function is evaluated for a set of candidate beamsteering vectors, which represent candidate angles-of-arrival.

Embodiments of the processes performed by the apparatus 100 will now be described.

A first example determination process will be described followed by a second example determination process. The first and second determination processes establish different ways for efficiently evaluating the objective function. In one or more examples and in summary, the first determination process comprises a way to reduce the size of the search space over which the objective function is evaluated. In one or more examples and in summary, the second determination process reduces the complexity of the evaluation of the objective function by proposing a direction-of-arrival angle for at least one of the targets and then evaluating the objective function based on the proposed direction-of-arrival in combination with different direction-of-arrival angles for the other targets over the search space.

It is seen that for 'K' targets and '$N_\theta$' points to be evaluated, the search space has size of $$N_K = \binom{N_\theta}{K}.$$

For K=2 targets, this value is $\sim 2^{15}=32k$. In this full DML search, the objective function or "cost" function is evaluated for each combination of possible DoA of the plurality of targets. This is very time consuming. Thus, we provide a method that may provide for a reduction in the complexity and thus the time consuming nature of the evaluation.

Figure 5:
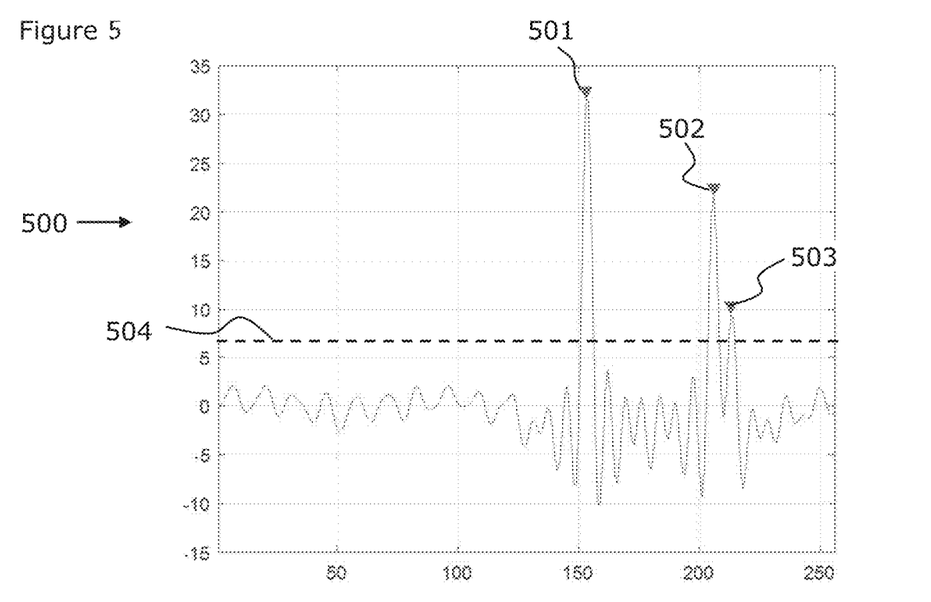
FIG. 5 shows an example beam-forming spectra.

FIG. 5 shows a beam-forming spectra 500 obtained from an input dataset or snapshot $\underline{x}$ that was received from an antenna comprising an example Uniform Linear Array of thirty two antenna elements. The x-axis shows the points of the search space wherein each grid point corresponds to a Direction-of-Arrival angle and the y-axis shows a magnitude.

The beam forming spectrum comprises a Fourier transform of a vector derived from the received dataset. Thus, the amplitude and phase information from each of the antenna elements may be collated and represented as a vector. The amplitude and phase information may be presented in the vector as a plurality of complex representations, as will be familiar to those skilled in the art. In one or more examples the Fourier transform comprises a Fast Fourier Transform or FFT. The FFT may be configured to operate on a particular size of input vector. Thus, in one or more examples, the vector derived from the input dataset may be padded, such as with zeros, so that it meets the particular size.

In general, it may be said that the beam forming spectrum represents the magnitude of the radar signals reflected from the plurality of targets over a range of direction-of-arrival angles. Further, in general, the beam forming spectrum may be defined as a correlation of the input dataset (or "snapshot") with a set of beamsteering vectors, wherein the set of beamsteering vectors include one beamsteering vector for each point of the search space and therefore represent each of the different Direction-of-Arrival angles considered in the search space. It is noted that a beamsteering vector represents the expected response at the antenna elements of a single target or one of a plurality of targets with unit amplitude and comprises a function of Direction-of-Arrival angle. Thus, in one or more examples, the beamsteering vector comprises a function that defines the response at the antenna elements of radar signals reflected from a point, wherein the point is expressed as an direction of arrival angle from the antenna elements. Thus, it can be considered that a beamsteering vector exists for each point in the search space. In one or more examples, the beam forming spectrum is determined by a correlation of the input dataset with all (or some if less accuracy is acceptable) of the beamsteering vectors. However, in formulation of the objective function a beamsteering vector may selected for each proposed target based on which candidate direction-of-arrival angle is being evaluated.

It will be appreciated that a FFT is a computationally efficient correlator for cases where the vectors have a particular relation. Thus, the spectrum may also be defined as a Fourier transform of the input dataset wherein the input dataset is formed of complex representations of the amplitude and phase of the radar signals.

Numerous peaks are present that may be indicative of direction-of-arrival angles of one or more of the targets.

Thus, the apparatus 101 may be configured to define a first-reduced search space based on angles of the search space for which the beam-forming spectra 500 is above a threshold level 504. In one example, the directions of arrival covered by peaks 501, 502 and 503 satisfy this condition and thus define the first-reduced search space. In the example, a first peak 501, at the threshold level 504, covers grids point 150 to approximately 160; a second peak 502, at the threshold level 504, covers grid points 205 to approximately 212; and a third peak 503, at the threshold level 504, covers grid points 220 to approximately 225. Thus, the points in the search space may form the first-reduced search space. As will be understood, the points in the search space have a predetermined association with direction of arrival angles of the targets.

In the present example and as will be described later, only the individual angles designated by the greatest magnitude of each peaks 501, 502, 503 are included in the first-reduced search space.

Thus, the objective function may then be evaluated over the angles defined in the first-reduced search space. In fact the exact methodology of the DML based evaluation of the objective function can vary between embodiments, as the advantage may be obtained by the selection of one or more ranges or direction-of arrival angles, such as discontinuous ranges/angles as shown in FIG. 5, to define the first-reduced search space. The values of the evaluated objective function are tracked to identify the candidate direction of arrival angles within the first-reduced search space that maximize or minimize the objective function.

Thus, by employing a thresholding operation we can pick only the peaks of interest to drastically reduce the search space.

The threshold level 504 may be predetermined. In other examples, the threshold level 504 may be selected such that a predetermined number of points in the search space define the first-reduced search space. Thus, a number of points in the search space may be defined and the threshold 504 may be iteratively lowered until the peaks intersected by the threshold based on the location of the peaks have the predetermined number of points. In other examples, the threshold level is 504 is predetermined and based on the antenna array configuration. The antenna array design has been found to be a significant factor in the number of peaks generated in the beam-forming spectra 500 and the number of side lobes. If we use a too large threshold level we might miss out on weak targets, such as may be represented by smaller peak 503. However, if the threshold level is small then a much greater number of peaks are considered in the first-reduced search space which reduces the computational efficiency. Thus, the predetermined threshold level 504 may be defined for a given array configuration.

Once the peaks are obtained from the thresholding operation of the beam-forming spectrum, the DML objective function may be evaluated in one or two steps for all the combinations of these peaks. For the example in FIG. 5, three peaks are present at discrete angles or points in the search space which we name P1 for peak 501, P2 for peak 502 and P3 for peak 503. These points form the first-reduced search space. Thus, in the first step the objective function is evaluated for six points comprising ({P1,P1}, {P2,P2}, {P3,P3}, {P1,P2}, {P1,P3}, {P2,P3}). Note that evaluating the cost function for {P1,P2} and {P2,P1} produces the same result, hence we only consider one of these two pairs. It will be appreciated that if there was also consideration of the possibility of three targets in addition to the two target possibility considered above, the objective function may be further evaluated for {P1,P2,P3}.

The pair of candidate angles or points (although it could be a set of at least two) in the first-reduced search space which results in the objective function having the highest value (or lowest value depending on its formulation) is chosen in this first step.

Thus, in summary, the processor 102 is configured to identify two or more peaks in the beam forming spectrum 500 based on a predetermined threshold level 504, wherein the two or more peaks comprise peaks that exceed the predetermined threshold level 504. From each peak, the processor is configured to determine one (or more) candidate direction-of-arrival angle (which correspond to one (or more) points) in the search space) that corresponds to the peak. Thus, in one or more examples, the number of candidate direction-of-arrival angles correspond to the number of identified peaks. The first-reduced search space is then based on the two or more candidate direction-of-arrival angles.

If the spectrum 500 has no peaks or only one peak, then the processor may be configured to perform only the second determination process defined below.

The method then proceeds to the second step described below. It will be appreciated that in some example implementations, the second step may not be required.

In the second step, which we refer to as the fine tuning step, a second-reduced search space is defined and the objective function is evaluated. The second-reduced search space includes the candidate angles or points and their neighbouring candidate angles or points. For example if we chose 'M' neighbouring candidate angles/points to evaluate the objective function, then for the chosen pair from the first step, we define the second-reduced search space with M-candidate points directly around the chosen pair. For example, if the chosen pair with highest value from the first step was {P1,P2} then the second-reduced search space would consist of a combination of points in the search grid {P1−M, . . . P1, . . . P1+M, P2−M, . . . P2, . . . P2+M}. Thus, as an example, if M is chosen as '2', then the number of points in the second-reduced search space of this second step would be twenty four. The number of neighbouring candidate angles/points in the second-reduced search space, i.e. defined by the value of 'M', may be chosen based on the main lobe width of the array and the granularity of the points in the search space used in the DML process. In most embodiments, the value of M is predetermined and may be based on the antenna array.

This second step may be performed to ensure that if there are in fact two or more targets within a single peak or "main lobe" then the method can identify them as two (or more) separate targets. In one or more examples, the presence of multiple targets can influence the position of one another in the beamforming spectrum. Accordingly, the second step may be useful in identifying possible candidate DoA angles for multiple targets that would affect the location of the peaks.

Thus, to summarise, the processing performed using the first-reduced search space and the optional second-reduced search space:
1) Perform FFT processing of the snapshot to obtain the beamforming spectrum
2) Perform the thresholding operation to obtain the peaks of interest from the spectrum
3) Perform the DML search by repeated evaluation of the objective function over the first-reduced search space, and optionally also over the second-reduced search space, which comprises:

a. evaluate the objective function for the combination of chosen peaks in step 2 and report the one that results in the maximum (or minimum, depending on the formulation) evaluation of the objective function
b. identify the points of the search space with the chosen pair in Step 3a along with one or more or 'M' neighbours on either side. Evaluate the DML objective function on combinations of these points to find the one that maximizes (or minimizes, depending on the formulation) the DML objective function.

4) Report the candidate angles obtained in Step 3 as a first set of estimated DoA angles for the K targets, where K is two or more.

In one or more examples, the apparatus 101 may be configured to determine a final DoA estimate for K targets based on the first set of estimated DoA angles obtained using the first determination process and a second set of estimated DoA angles obtained by a second determination process as described in the paragraphs that follow. In other examples, the points to be evaluated are established by the first determination process and by the second determination process described below and a single evaluation step over those points is performed to arrive directly at the final set of DoA angle estimates. The evaluation of the objective function for a reduced set of all possible DoA angles of the plurality of targets at least defined by the first determination process and the second determination process may be computationally advantageous while remaining effective.

In one or more examples, it has been found that use of the combination of the first set of estimated DoA angles and the second set of estimated DoA angles, provides a computationally efficient method for obtaining DoA estimates having an accuracy equivalent to more conventional methods in which the entire search space is searched.

Figure 6:
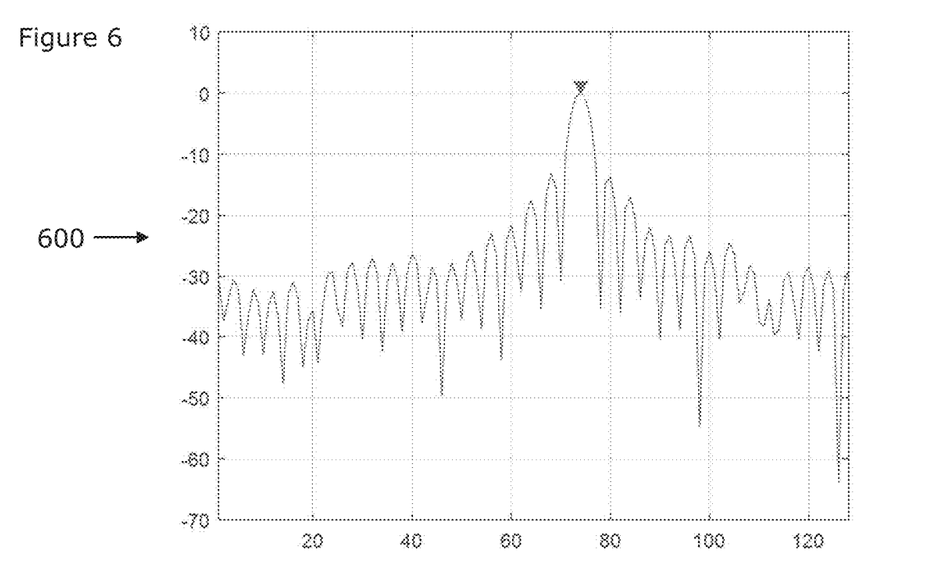
FIG. 6 shows a second, example beam-forming spectra.

In one or more examples, it has been found that if there are two (or more) targets present, one of which has very low reflected power compared to the other, then the target with the lower reflected power may not be detected in the beam forming spectrum as it will be masked by the side lobe levels (SLL) of the configuration of the antenna array 103. It has been found that in some examples, the chance of a lower reflected power target being indistinguishable from the SLLs can be very high for a MRA antenna array because they have higher SLLs when compared to a Uniform Linear Array (ULA) antenna. Example FIG. 6 shows an example of beam forming spectrum 600 obtained from ULA of thirty-two antenna elements. Looking at the spectrum 600 it could be concluded that only one target can be detected, whereas the truth is that there are two targets. The second target has very low power and thus is not visible in the example beamforming spectrum.

The second determination process will now be described. Firstly, the beam forming spectrum 500, as determined earlier, is evaluated to determine the angle of the peak with greatest magnitude. In the example spectrum 500 of FIG. 5 the peak with the greatest magnitude comprises the first peak 501 which was designated above as being at point P1. Thus, the point in the search space with which the first peak 501 is associated, in this example, is about point 155, which corresponds to a direction-of-arrival angle. Thus, the angle associated with point P1 is chosen as the DoA angle of a notional first target of a plurality of targets. With the first target position (P1) being fixed, the DML objective function is evaluated for the '$N_{74}$' points of the search space but with the angle of one of the plurality of targets, e.g. a "first" target, set to P1. Thus, the repeated evaluation of the objective functions steps through the search space for the combinations ($\{1,P1\},\{2,P1\},\ldots\{N_\theta,P1\}$) for the $N_\theta$ points of the search space. As will be apparent, the second determination process can identify multiple targets that are far apart as well as close together.

Thus, in this search we effectively assume that the position of one target is known (e.g. at P1) and the position of second target is evaluated over the No grid points.

In this second determination process, a prior information of the position of second (or third and so on) target is not obtained from the beamforming spectrum i.e. from the less significant peaks 502, 503. Thus, it has been found that two (or more) targets with a wide disparity in reflected signal strength may be estimated accurately. In particular, using this technique may enable the DML algorithm to estimate the DoA of targets that have a reflected power level lower than the SLL of the antenna array design used by the apparatus 101 (when there is sufficient Signal to Noise ratio).

It has been found that this method works very well with ULA antenna configurations even if the power difference between the targets is small. However, when we have MRA antenna, the spectrum of two targets of equal power may have SLL that is higher than the main lobe level. Hence, an improved search process can be achieved by performing the search over the first-reduced search space in combination with the search over the second-reduced search space (for one of the targets).

The final DoA estimate is determined by determining which of the first set of estimated DoA angles and the second set of estimated DoA angles result in the maximum evaluation of the objective function (or minimum depending on the formulation of the objective function). In other examples, a single evaluation process of the objective function is performed based on evaluation of the objective function over the first-reduced search space and the evaluation of the points of the search space as defined in the second determination process.

Accordingly, the process results in determination of the final DoA estimate directly.

Another important consideration is to design the array optimally for the DoA estimation algorithm that is being used. If a ULA is used instead of MRA then the DML search space can be reduced to a large extent ensuring there is enough budget to estimate more number of targets. This comes with a cost of better angular resolution that can be obtained using a MRA with a larger aperture compared to the ULA. Thus, the DoA estimation algorithm used can influence the array design decisions.

While example FIGS. 3 and 4 illustrate a 1D antenna array, the method and processor described herein can be easily extended for a 2D antenna array by deriving the beam-forming spectrum in the same way but in 2-dimensions. The thresholding step may be applied and the peaks above a certain threshold are selected as the starting point for the DML 2D search space. In this embodiment, the azimuth and elevation of the targets can be evaluated using the DML function wherein the DML objective function for a single target will now have 2 dimensional points, each corresponding to azimuth and elevation AoA.

Figure 7:
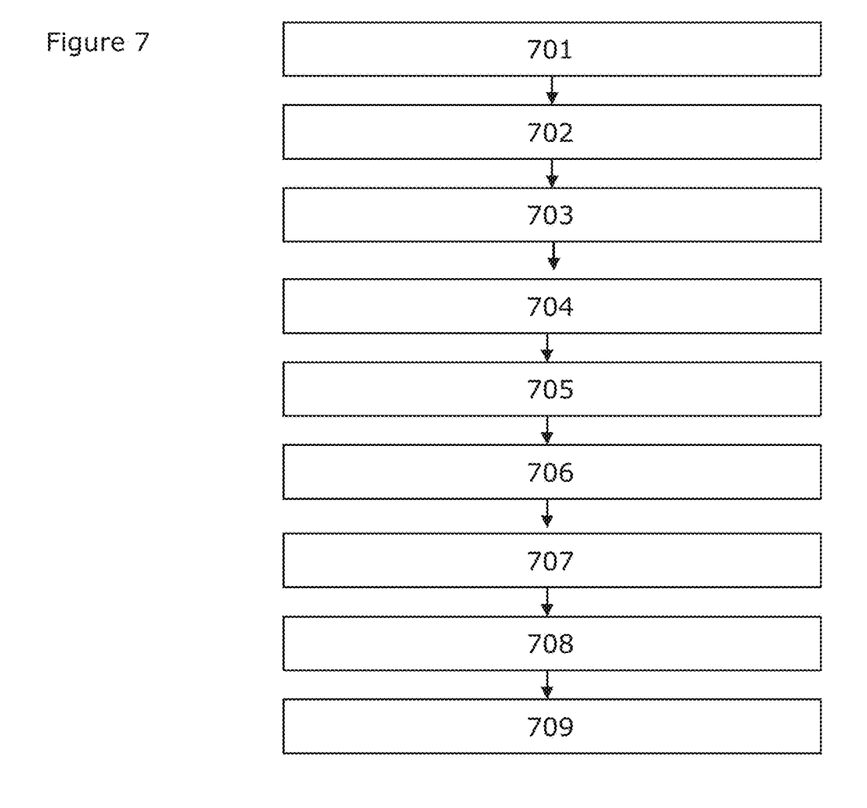
FIG. 7 shows a flowchart illustrating an example method.

FIG. 7 shows a flow chart illustrating an example method for determining direction-of-arrival angles for radar signals, the method comprising:

receiving 701 an input dataset indicative of the amplitude and phase of radar signals received at a plurality of antenna elements, wherein the radar signals have reflected from a plurality of targets;

determining 702 an objective function, based on the input dataset, for evaluation over a plurality of points of a search space, the points of the search space representing possible direction-of-arrival angles of said radar signals from the plurality of targets and wherein the objective function is indicative of the correspondence between the possible direction-of-arrival angles of said plurality of targets and the input dataset;

determining 703 a beam forming spectrum, the beam forming spectrum comprising a correlation of the input dataset with a set of beamsteering vectors, wherein the set of beamsteering vectors include one beamsteering vector for each point of the search space wherein a beamsteering vector comprises a function of direction-of-arrival angle that represents the expected response at the plurality of antenna elements of a target with unit amplitude, which may be calculated by a Fourier transform of the input dataset;

performing a first determination process of the objective function comprising:

identifying 704 two or more peaks in the beam forming spectrum based on a predetermined threshold level, whether the two or more peaks comprise peaks that exceed the predetermined threshold level, determining 705 two or more candidate direction-of-arrival angles that correspond to the identified two or more peaks, and wherein the number of candidate direction-of-arrival angles correspond to the number of identified peaks; and defining 706 a first-reduced search space based on the two or more candidate direction-of-arrival angles;

performing a second determination process of the objective function comprising:

determining 707 a peak direction-of-arrival angle comprising the direction-of-arrival angle that corresponds to a peak in the beam forming spectrum that has the greatest magnitude;

evaluating 708 the objective function to determine a final set of estimated direction-of-arrival angles for the plurality of targets comprising the direction-of-arrival angles which one of maximize or minimize the objective function, wherein the objective function is evaluated over the first reduced search space and wherein said evaluating of the objective function is performed with the direction-of-arrival angle of one of the plurality of targets set to the peak direction-of-arrival angle and the direction-of-arrival angle of the other of the plurality of targets is iteratively set to the direction-of-arrival angles that correspond to the points of the search space.

Figure 8:
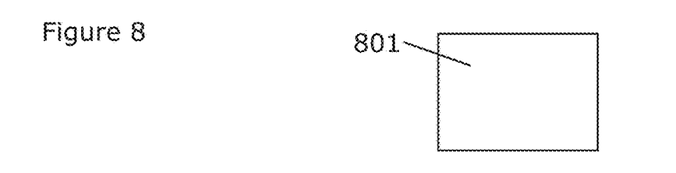
FIG. 8 shows an example computer readable medium.

FIG. 8 shows an example computer program product, such as a non-transitory computer program product, comprising computer program code which, when executed by the processor 102 of the apparatus 101 causes the apparatus 101 to perform the method described herein and as exemplified in FIG. 7. The computer program product may comprise an aspect of the disclosure.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising a processor configured to: receive an input dataset indicative of amplitudes and phases of radar signals received at a plurality of antenna elements, wherein the radar signals have reflected from a plurality of targets; determine an objective function, based on the input dataset, for evaluation over a plurality of points of a search space, the points of the search space representing possible direction-of-arrival angles of said radar signals from the plurality of targets and wherein the objective function is indicative of a correspondence between the possible direction-of-arrival angles of said plurality of targets and the input dataset; determine a beam forming spectrum, the beam forming spectrum comprising a correlation of the input dataset with a set of beamsteering vectors, wherein the set of beamsteering vectors include one beamsteering vector for each point of the search space wherein a beamsteering vector comprises a function of direction-of-arrival angle that represents an expected response at the plurality of antenna elements of a target with unit amplitude; perform a first determination process for evaluation of the objective function comprising the processor being configured to: identify two or more peaks in the beam forming spectrum based on a predetermined threshold level, wherein the two or more peaks comprise peaks that exceed the predetermined threshold level, determine two or more candidate direction-of-arrival angles that correspond to the identified two or more peaks; define a first-reduced search space based on the two or more candidate direction-of-arrival angles; perform a second determination process for evaluation of the objective function comprising the processor being configured to: determine a peak direction-of-arrival angle comprising the direction-of-arrival angle that corresponds to a peak in the beam forming spectrum that has the greatest magnitude; and wherein the processor is configured to: evaluate the objective function to determine a final set of estimated direction-of-arrival angles for the plurality of targets comprising the direction-of-arrival angles which one of maximize or minimize the objective function wherein the objective function is evaluated over the first reduced search space and wherein said evaluation of the objective function is performed with the direction-of-arrival angle of one of the plurality of targets set to the peak direction-of-arrival angle and the direction-of-arrival angle of the other of the plurality of targets is iteratively set to the direction-of-arrival angles that correspond to the points of the search space.

2. The apparatus of claim 1, wherein if a number of peaks identified in the beam forming spectrum is three or more, the evaluation of the objective function over the first-reduced search space is at least based on a first proposal in which the plurality of targets comprise two targets and wherein the objective function is evaluated for different combinations of two of the candidate direction-of-arrival angles.

3. The apparatus of claim 2, wherein if the number of peaks identified in the beam forming spectrum is three or more, the evaluation of the objective function over the first-reduced search space is at least based on a second proposal in which the plurality of targets comprise three targets and wherein the objective function is evaluated for different combinations of three of the candidate direction-of-arrival angles.

4. The apparatus of claim 1, wherein if the number of peaks identified in the beam forming spectrum is two, a first set of estimated direction-of-arrival angles comprises the candidate direction-of-arrival angles.

5. The apparatus of claim 1, wherein the first determination process of the objective function comprises a first step and a second step, wherein the first step comprises the determination of the two or more candidate direction-of-arrival angles that correspond to the identified two or more peaks; and the definition of the first-reduced search space based on the two or more candidate direction-of-arrival angles; and wherein the second step comprises the processor being configured to: select a combination of candidate direction-of-arrival angles of the two or more candidate direction-of-arrival angles which resulted in one of the highest or lowest evaluation of the objective function; define a second-reduced search space comprising the selected combination of candidate direction-of-arrival angles and including a predetermined number of points in the search space either side of each of the selected combination of candidate direction-of-arrival angles; and wherein the evaluation of the objective function additionally includes the evaluation over the second-reduced search space.

6. The apparatus of claim 1, wherein the correlation to determine the beam forming spectrum is calculated by Fourier transform of the input dataset, wherein the input dataset is formed of complex representations of the amplitudes and phases of the radar signals.

7. The apparatus of claim 1, wherein the predetermined threshold level is based on a configuration of the plurality of antenna elements.

8. The apparatus of claim 1, wherein the final set of direction-of-arrival angles comprises the direction-of-arrival angles that resulted in the one of the maximal and minimal evaluation of the objective function as determined based on the first determination process and the second determination process.

9. The apparatus of claim 1, wherein the apparatus comprises a frequency-modulated-continuous-wave, FMCW, radar system.

10. The apparatus of claim 1, wherein if only one peak is found in the beam forming spectrum the apparatus is configured to perform the second evaluation process.

11. The apparatus of claim 1, wherein the input dataset comprises a dataset that has been Range-Doppler processed such that the input dataset is representative of radar signals that have reflected from targets at a predetermined range of distances from the antenna elements and a predetermined range of radial velocities relative to the antenna elements.

12. The apparatus of claim 1, wherein one of: the objective function is formulated such that the greater the value obtained upon its evaluation, the greater the probability that the possible direction-of-arrival angles used in its evaluation are those that resulted in the receipt of the input dataset and wherein said evaluation of the objective function is configured to maximize the objective function; and the objective function is formulated such that the lesser the value obtained upon its evaluation, the greater the probability that the possible direction-of-arrival angles used in its evaluation are those that resulted in the receipt of the input dataset and wherein said evaluation of the objective function is configured to minimize the objective function.

13. The apparatus of claim 1, wherein the plurality of antenna elements comprise one of: a Multifunction Reconfigurable Antenna, MRA, Multiple-In-Multiple-Out, MIMO, antenna array; a Uniform Linear Array antenna.

14. A method for determining direction-of-arrival angles for radar signals, the method comprising: receiving an input dataset indicative of amplitudes and phases of radar signals received at a plurality of antenna elements, wherein the radar signals have reflected from a plurality of targets; determining an objective function, based on the input dataset, for evaluation over a plurality of points of a search space, the points of the search space representing possible direction-of-arrival angles of said radar signals from the plurality of targets and wherein the objective function is indicative of a correspondence between the possible direction-of-arrival angles of said plurality of targets and the input dataset; determining a beam forming spectrum, the beam forming spectrum comprising a correlation of the input dataset with a set of beamsteering vectors, wherein the set of beamsteering vectors include one beamsteering vector for each point of the search space wherein a beamsteering vector comprises a function of direction-of-arrival angle that represents an expected response at the plurality of antenna elements of a target with unit amplitude; performing a first determination process for evaluation of the objective function comprising: identifying two or more peaks in the beam forming spectrum based on a predetermined threshold level, whether the two or more peaks comprise peaks that exceed the predetermined threshold level, determining two or more candidate direction-of-arrival angles that correspond to the identified two or more peaks, and wherein the number of candidate direction-of-arrival angles correspond to the number of identified peaks; defining a first-reduced search space based on the two or more candidate direction-of-arrival angles; performing a second determination process for evaluation of the objective function comprising: determining a peak direction-of-arrival angle comprising the direction-of-arrival angle that corresponds to a peak in the beam forming spectrum that has the greatest magnitude; wherein the method comprises evaluating the objective function to determine a final set of estimated direction-of-arrival angles for the plurality of targets comprising the direction-of-arrival angles which one of maximize or minimize the objective function, wherein the objective function is evaluated over the first reduced search space and wherein said evaluating of the objective function is performed with the direction-of-arrival angle of one of the plurality of targets set to the peak direction-of-arrival angle and the direction-of-arrival angle of the other of the plurality of targets is iteratively set to the direction-of-arrival angles that correspond to the points of the search space.

15. A non-transitory computer readable medium comprising computer program code configured to perform the method of claim 14.

16. The method of claim 14, wherein if a number of peaks identified in the beam forming spectrum is three or more, the evaluation of the objective function over the first-reduced search space is at least based on a first proposal in which the plurality of targets comprise two targets and wherein the objective function is evaluated for different combinations of two of the candidate direction-of-arrival angles.

17. The method of claim 15, wherein if the number of peaks identified in the beam forming spectrum is three or more, the evaluation of the objective function over the first-reduced search space is at least based on a second proposal in which the plurality of targets comprise three targets and wherein the objective function is evaluated for different combinations of three of the candidate direction-of-arrival angles.

18. The method of claim 14, wherein if the number of peaks identified in the beam forming spectrum is two, a first set of estimated direction-of-arrival angles comprise the candidate direction-of-arrival angles.

19. The method of claim 14, wherein the first determination process of the objective function comprises a first step and a second step, wherein the first step comprises the determination of the two or more candidate direction-of-arrival angles that correspond to the identified two or more peaks; and the definition of the first-reduced search space based on the two or more candidate direction-of-arrival angles; and wherein the second step comprises the processor being configured to: select a combination of candidate direction-of-arrival angles of the two or more candidate direction-of-arrival angles which resulted in one of the highest or lowest evaluation of the objective function; define a second-reduced search space comprising the selected combination of candidate direction-of-arrival angles and including a predetermined number of points in the search space either side of each of the selected combination of candidate direction-of-arrival angles; and wherein the evaluation of the objective function additionally includes the evaluation over the second-reduced search space.

20. The method of claim 14, wherein the correlation to determine the beam forming spectrum is calculated by Fourier transform of the input dataset, wherein the input dataset is formed of complex representations of the amplitudes and phases of the radar signals.

* * * * *